(12) United States Patent
Lee et al.

(10) Patent No.: US 7,885,337 B2
(45) Date of Patent: Feb. 8, 2011

(54) EFFICIENT VIDEO SLICING

(75) Inventors: Yen-Chi Lee, San Diego, CA (US);
Ming-Chang Tsai, San Diego, CA (US);
Khaled Helmi El-Maleh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1648 days.

(21) Appl. No.: 11/018,076

(22) Filed: Dec. 20, 2004

(65) Prior Publication Data

US 2006/0039483 A1    Feb. 23, 2006

Related U.S. Application Data

(60) Provisional application No. 60/603,978, filed on Aug. 23, 2004.

(51) Int. Cl.
*H04B 1/66* (2006.01)
*H04N 7/12* (2006.01)
*H04N 11/02* (2006.01)
*H04N 11/04* (2006.01)

(52) U.S. Cl. .......................... 375/240.25; 375/240.26; 375/240.24

(58) Field of Classification Search ............ 375/240.28, 375/240.26, 240.24
See application file for complete search history.

(56) References Cited

U.S. PATENT DOCUMENTS

| | | | |
|---|---|---|---|
| 6,215,820 B1 * | 4/2001 | Bagni et al. .................. | 375/240 |
| 6,304,607 B1 * | 10/2001 | Talluri et al. ............ | 375/240.27 |
| 6,545,557 B2 | 4/2003 | Nagata | |
| 7,027,515 B2 * | 4/2006 | Lin ........................ | 375/240.25 |
| 7,124,429 B2 * | 10/2006 | Nagai et al. .................. | 725/135 |

(Continued)

FOREIGN PATENT DOCUMENTS

WO    03041326    5/2003

(Continued)

OTHER PUBLICATIONS

Masala, E Rate distortion optimized slicing, packetization and coding for error resilient video transmission, Data Compression Conference, 2004, Proceedings, DCC 2004 Mar. 23-25, 2004 p. 182-191.*

(Continued)

*Primary Examiner*—Marsha D Banks Harold
*Assistant Examiner*—Jessica Roberts
(74) *Attorney, Agent, or Firm*—Timothy F. Loomis; John Rickenbrode (57) ABSTRACT

The disclosure is directed to a video slicing technique that promotes low complexity, bandwidth efficiency and error resiliency. A video encoder places an RM close to the beginning of each logical transmission unit (LTU) so that all but a very small end segment of each video slice fits substantially within an LTU. Instead of requiring placement of RMs exactly at the LTU boundaries, a video encoder applies an approximate alignment technique. Video slices are encoded so that RMs are placed close to the beginning of each LTU, e.g., at the end of the first MB falling within the LTU. A portion of the last MB from the preceding slice carries over into the next LTU. Loss of an LTU results in loss of virtually the entire current slice plus a very small portion of the previous slice.

33 Claims, 6 Drawing Sheets

U.S. PATENT DOCUMENTS 7,340,667 B2 * 3/2008 Saado et al. ............... 714/776
2001/0038650 A1 * 11/2001 Park et al. ................. 370/537

FOREIGN PATENT DOCUMENTS

WO     WO 03/041326 A2 * 5/2003

OTHER PUBLICATIONS

Chang, Y. C. et al. "Performance Evaluation of MPEG-4 Visual Error Resilient Tools Over a Mobile Channel". IEEE Transactions on Consumer Electronics, vol. 49, No. 1. Feb. 2003.

Garudadri. "Video Quality Evaluation Procedure". TSG-C WG1.2, Conference Call. 'Online! Nov. 2003.

Masala et al. "Rate-Distortion Optimized Slicing, Packetization and Coding for Error Resilient Video Transmission". Data Compression Conference. IEEE Mar. 2004.

Garudadri et al. "Video Delivery in cdma2000® Networks". TSG-C SWG1.2 Ad Hoc. 'Online! May 2004.

International Search Report and Written Opinion - PCT/US2005/029987, International Search Authority - European Patent Office - Dec. 23, 2005.

* cited by examiner

EFFICIENT VIDEO SLICING

This application claims the benefit of U.S. Provisional Application No. 60/603,978, filed Aug. 23, 2004, the entire content of which is incorporated herein by reference.

TECHNICAL FIELD

The disclosure relates to digital video encoding and, more particularly, techniques for slicing digital video frames.

BACKGROUND

In a typical video encoder implementation, digital video frames are segmented into video slices at the encoder side to reduce the impact of data losses during transmission. Each video slice is independently encoded and decoded. When an error is detected, a decoder conceals all macroblocks (MBs) within the corrupted slice. Concealment prevents the presentation and propagation of wrongly decoded MBs that could otherwise degrade the quality of the video presented to the user.

A video slice typically starts with a resynchronization marker (RM) that can be used by the decoder to re-establish synchronization when errors are detected. To minimize data loss, a video slice ideally corresponds to the smallest loss unit within a video transmission system. The smallest loss unit is the smallest unit of information transmitted across the communication channel. In a wireless system, the smallest loss unit is referred to as a logical transmission unit (LTU), which may have a fixed or variable length.

If each video slice is the size of an LTU, any errors due to LTU loss will be localized within the lost slice without affecting other slices. However, it is difficult to achieve exact alignment between video slices and LTUs. In particular, RMs can only be placed at MB boundaries, and cannot be placed arbitrarily within the video frame. As a result, it is difficult for the encoder to adjust the slice size to fit exactly within a given LTU.

One technique for LTU-slice alignment involves slice-level rate control to adjust the quantization step-size of MBs to adjust slice length. Unfortunately, this technique adds significant complexity to the encoder design, and is not necessarily exact. Another technique involves encoding a slice until its size exceeds a predefined length, and then adding padding bytes between the end of the encoded video and the end of the LTU. However, this approach undermines bandwidth efficiency.

SUMMARY

In general, the disclosure is directed to a video slicing technique that promotes low complexity, bandwidth efficiency and error resiliency. According to this technique, a video encoder places an RM close to the beginning of each LTU so that all but a very small end segment of each video slice fits substantially within an LTU.

Instead of requiring placement of RMs exactly at the beginning of LTUs, as would be required for strict alignment of video slices and LTUs, a video encoder applies an approximate alignment technique. According to this technique, video slices are encoded so that RMs are placed close to the beginning of each LTU, e.g., at the end of the first MB falling within the LTU. Hence, a portion of the last MB from the preceding slice carries over into the next LTU. In this case, loss of an LTU results in loss of virtually an entire slice plus a very small portion, e.g., one MB, of a preceding slice.

As in the preceding slice, a very small portion, e.g., one MB, of the lost slice will be carried into the next LTU. However, that portion will not be used for decoding. This approximate alignment technique can be achieved with significantly reduced complexity, relative to exact alignment techniques, with the cost of just one additional MB in lost data. There is no need to place RMs exactly at LTU boundaries or provide slice-level control of the MB quantization step. This results in reduced complexity. Also, there is no need for padding bytes within a slice, resulting in bandwidth efficiency.

In one embodiment, the disclosure describes a video encoding method. The method comprises determining a size of a logical transmission unit (LTU), generating a target video slice size equivalent to the LTU size, and encoding a first video slice until a size of the video slice is greater than the target video slice size. The method further comprises determining a difference between the size of the first video slice and the target video slice size, inserting a resynchronization marker (RM) at an end of the first video slice, updating the target video slice size to equal the LTU size minus the difference, and encoding a second video slice until a size of the second video slice is greater than the updated target video slice size. The disclosure also contemplates computer-readable media comprising instructions to cause a processor to perform such a method.

In another embodiment, the disclosure describes a video encoding system comprising a logical transmission unit (LTU) size estimator module to estimate a size of an LTU, a slice size determination module to determine a target video slice size, and a video slice generator to encode a first video slice until a size of the video slice is greater than the target video slice size, the video slice generator determining a difference between the size of the video slice and the target video slice size, and inserting a resynchronization marker (RM) at an end of the first video slice. The slice size determination module updates the target video slice size to equal the LTU size minus the difference. The video slice generator encodes a second video slice until a size of the second video slice is greater than the updated target video slice size.

In a further embodiment, the disclosure describes a video encoding method comprising segmenting a digital video frame into video slices, and sizing each of the slices such that a first portion of each slice resides within one first physical layer logical transmission unit (LTU) and a second portion of each slice resides within a second physical layer LTU, and the second portion is not more than one macroblock (MB) in size.

The details of one or more embodiments are set forth in the accompanying drawings and the description below. Other features, objects, and advantages will be apparent from the description and drawings, and from the claims.

DETAILED DESCRIPTION

Figure 1:
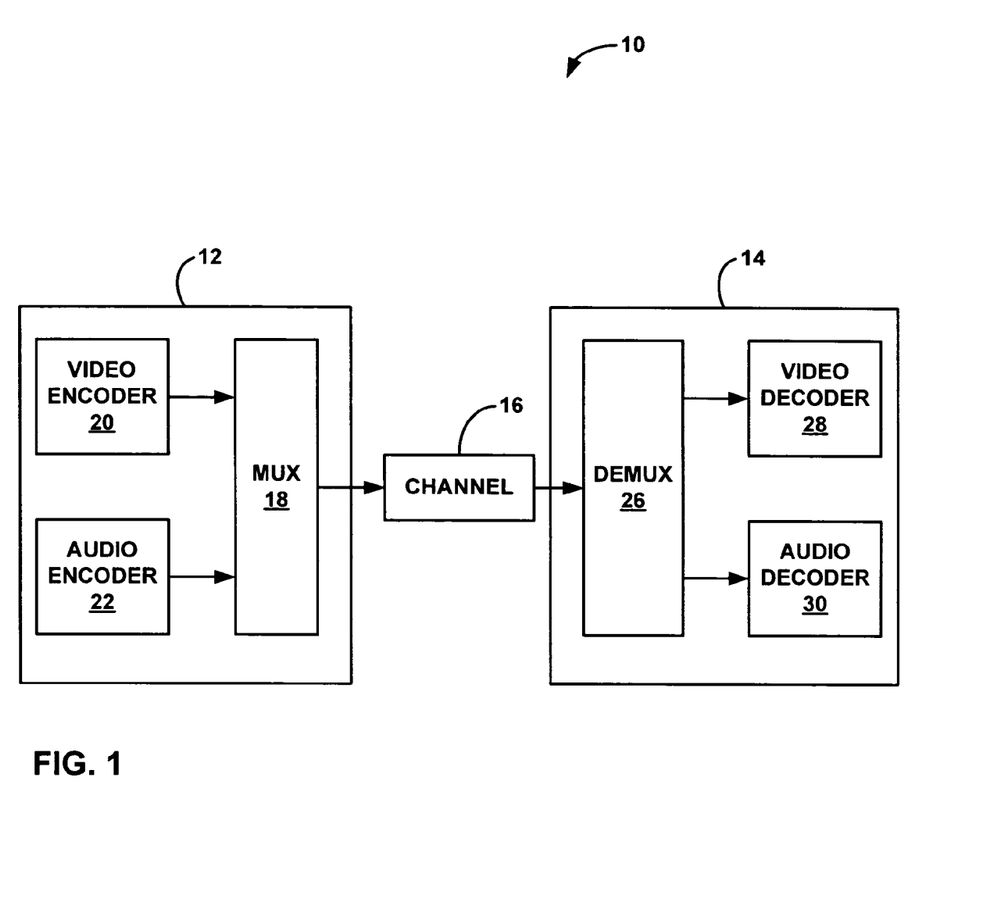
FIG. 1 is a block diagram illustrating a video/audio encoding and decoding system.

FIG. 1 is a block diagram illustrating a video encoding and decoding system 10. As shown in FIG. 1, system 10 includes an encoder system 12 and a decoder system 14 connected by a transmission channel 16. Encoder system 12 includes a multiplexer (MUX) 18, a video encoder 20 and an audio encoder 22. Decoder system 14 includes a demultiplexer (DEMUX) 26, a video decoder 28, and an audio decoder 30.

System 10 may provide bi-directional video transmission, e.g., for video telephony. Accordingly, reciprocal encoding, decoding, MUX and DEMUX components may be provided on opposite ends of channel 16. In some embodiments, encoder system 12 and decoder system 14 may be embodied within video communication devices such as wireless mobile terminals equipped for video streaming, video telephony, or both. The mobile terminals supporting video telephony according to the ITU H.324M standard, or other standards such as RTP/UDP/IP.

Video encoder 20 generates encoded video data according to a video compression method, such as MPEG-4. Other video compression methods may be used, such as the International Telecommunication Union (ITU) H.263, ITU H.264, or MPEG-2 methods. Audio encoder 22 encodes audio data to accompany the video data.

MUX 18 obtains adaptation layer video and audio data units from video encoder 20 and audio encoder 22. MUX 18 multiplexes the video data and audio data to form a series of multiplex data units for transmission via channel 16. As an example, MUX 18 and DEMUX 26 may operate according to the H.223 multiplexer protocol, published by the ITU. However, other protocols may be used, such as the user datagram protocol (UDP).

Channel 16 carries the multiplexed information to decoder system 14 as physical layer data units, which may be referred to as logical transmission units (LTUs). Channel 16 may be any physical connection between encoder system 12 and decoder system 14. For example, channel 16 may be a wired connection, such as a local or wide-area network. Alternatively, as described herein, channel 16 may be a wireless connection such as a cellular, satellite or optical connection.

DEMUX 26 identifies the multiplex data units from the LTUs and demultiplexes the content of the multiplex layer data units to produce video and audio adaptation layer data units. The adaptation layer data units are processed in the adaptation layer to produce video data frames. Video decoder 28 decodes the video data frames at the application layer to produce a stream of video data for use in driving a display device. In particular, video decoder 28 decodes individual video slices within the video data frames. Audio decoder 30 decodes the audio data to produce audio.

In accordance with this disclosure, encoder system 12 applies a low-complexity video slicing technique that offers bandwidth efficiency and error resiliency. Instead of requiring placement of RMs exactly at the beginning of LTUs, as would be required for strict alignment of video slices and LTUs, encoder system 10 applies an approximate alignment technique. According to this technique, video slices are encoded so that RMs are placed close to the beginning of each LTU, e.g., at the end of the first MB in the LTU. In this case, a single MB from a preceding slice carries over into the next LTU.

Using an approximate alignment technique, loss of an LTU results in loss of virtually an entire slice plus a very small portion, e.g., one MB, of the preceding slice. In particular, each LTU contains a very small end segment of a preceding slice followed by the majority of a current slice. Like the preceding slice, the current slice then has a small end segment that carries into the next LTU. Accordingly, each slice spans portions of two consecutive LTUs, providing a very slight overlap. Although a very small portion, e.g., one MB, of a slice will be carried into the next LTU, that portion will not be used for decoding if the preceding LTU is lost during transmission. If the previous LTU is not lost, however, this small portion can still be used for decoding for frame integrity. Therefore, in effect, the loss of an LTU results in the loss of an entire slice, plus the loss of an MB from a preceding slice.

An approximate alignment technique, as described herein, can be achieved with significantly reduced complexity, relative to exact alignment techniques, with the cost of just one additional lost MB. The one additional lost MB is the MB from the preceding slice, which carries into the lost LTU. According to this technique, there is no need to place RMs exactly at LTU boundaries or control MB quantization step at the slice level, reducing encoder implementation complexity. Also, there is no need for padding bytes within a slice, resulting in greater bandwidth efficiency.

Figure 2:
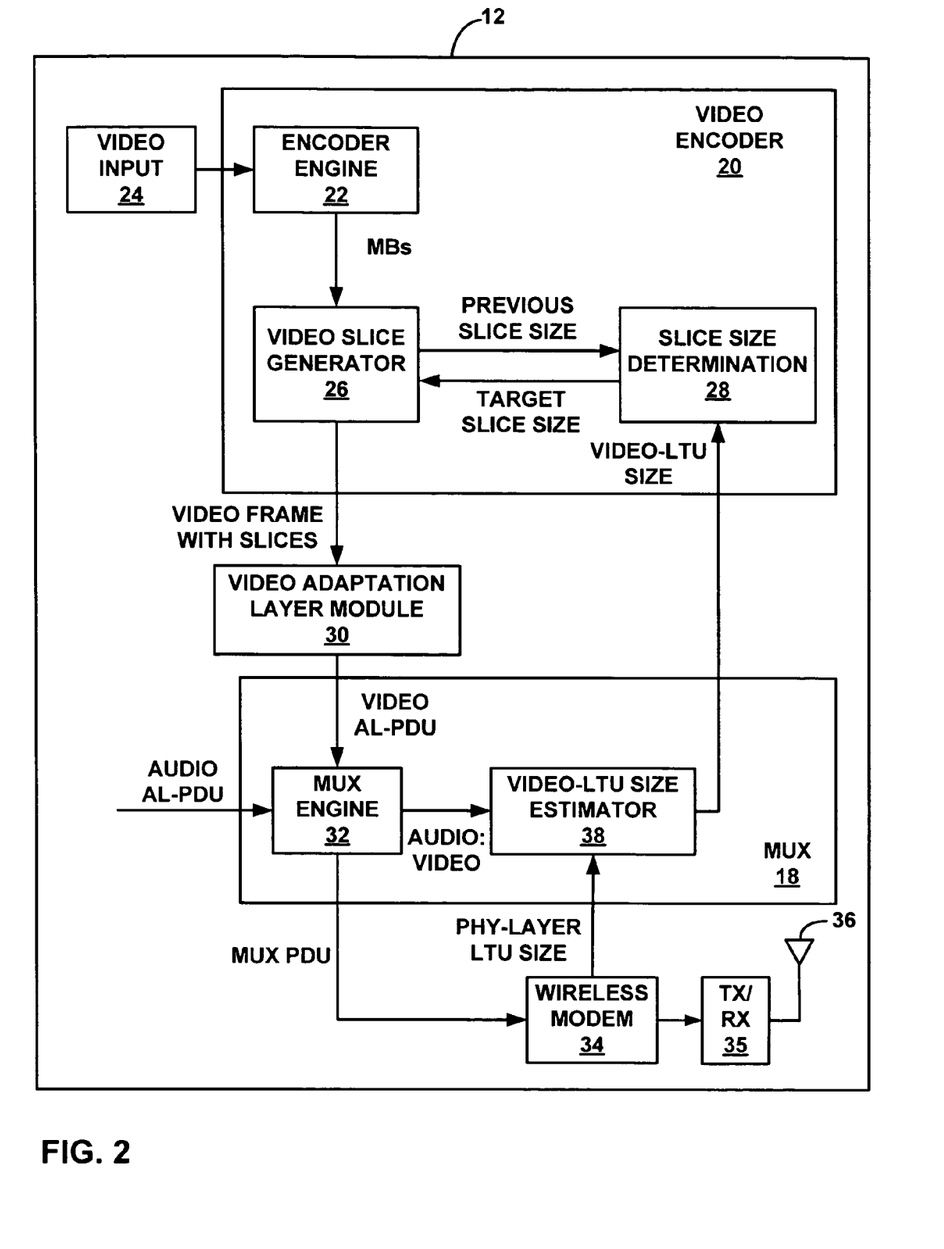
FIG. 2 is a block diagram illustrating a video encoder system employing a video slicing technique in accordance with this disclosure.

FIG. 2 is a block diagram illustrating an embodiment of a video encoder system 12 that applies an efficient video slicing technique in accordance with this disclosure. Video encoder system 12 may support a variety of video applications, including delivery of streaming video or video telephony, e.g., for H.324M videoconferencing. As shown in FIG. 2, video encoder system 12 includes MUX 18 and video encoder 20. Video encoder 20 includes an encoder engine 22 that receives video from a video input device 24, such as a video camera or video archive. Encoder engine 22 generates a series of macroblocks (MBs) from the incoming video bitstream.

Video slice generator 26 segments the video bitstream from encoder engine 22 into video slices. Each video slice carries a series of MBs, which may vary in number. To delineate successive slices, video slice generator 26 inserts an RM. The RM is inserted at a selected MB boundary. Accordingly, video slice generator 26 selectively inserts a series of RMs at selected MB boundaries to form a series of slices within a given video frame.

As will be described, a slice size determination module 28 guides video slice generator 26 to generate slices at appropriate locations. Slice size determination module 28 makes use of the previous slice size generated by video slice generator 26 and a video-LTU size to generate a target slice size. Video slice generator 26 applies the target slice size to make the next slice.

In this disclosure, the term "LTU" and video-LTU may be used somewhat interchangeably to refer to the video portion of a physical layer LTU. It should be understood, however, that a physical layer LTU ordinarily may include audio information, which may be designated as an audio-LTU. In reference to alignment of video slices with LTU boundaries, it should be understood that such boundaries may take into account the combination of an audio-LTU and video-LTU within physical layer LTU, and that such a boundary may refer to the boundary between successive LTUs arising from such a combination.

Adaptation layer module 30 receives video frames segmented into video slices from video slice generator 26, and generates video adaptation layer protocol data units (AL-PDUs). MUX 18 includes a MUX engine 32 that receives the video AL-PDUs and combines them with audio AL-PDUs received from an audio encoder and audio adaptation layer module (not shown) to form MUX PDUs for transmission via wireless modem 34, radio frequency transmitter/receiver (TX/RX) 35, and antenna 36. TX/RX 35 may be configured to transmit radio frequency (RF) wireless signals according to any of a variety of wireless transmission techniques such as Code Division Multiple Access (CDMA), wideband CDMA (W-CDMA), or Time Division Multiple Access (TDMA).

A video-LTU size estimator module 38 within MUX 18 tracks the size of the video portion of each MUX PDU generated by MUX engine 32 and the size of a physical layer LTU generated by wireless transmitter 34. For example, MUX engine 32 may provide video-LTU size estimator module 38 with an indication of the proportion of audio information to video information (AUDIO:VIDEO) within each MUX PDU. In addition, wireless modem 34 provides video-LTU size estimator module 38 with an indication of the actual size of LTUs transmitted over the air interface.

Using these parameters, video-LTU size estimator module 38 estimates the size of the video portion of each LTU, i.e., the video-LTU size. In some implementations, both AUDIO:VIDEO proportion and LTU size may be fixed. In other implementations, LTU size may be fixed, but AUDIO:VIDEO proportion may vary, e.g., for implementations in which variable rate audio encoding is used. In either case, it is apparent that video encoding system 12 provides a unique transport-encoder cross-layer design in which slice size is determined based on information provided by the physical layer, MUX layer, and application layer.

Video-LTU estimator module 38 communicates the video-LTU size to slice size determination module 28 in video encoder 20. Hence, slice size determination module 28 determines the target slice size using the video-LTU size obtained from video-LTU size estimator module 38 within MUX 18 and the previous slice size provided by video slice generator 26. Slice size determination module 28 then generates a target slice size for use by video slice generator 26 in generating slices and thereby inserting RMs at appropriate MB boundaries within the video frame.

In some embodiments, the physical layer LTUs may be W-CDMA RLC PDUs. Alternatively, the physical layer LTUs may take a variety of different forms, such as CDMA2000 1× RLP PDUs, CDMA2000 1× EV-DO RLP PDUs, CDMA2000 EV-DV RLP PDUs. MUX engine 32 generates MUX PDUs according to a multiplexing protocol, such as ITU H.223. However, the techniques described herein may be applicable to other video transport protocols, such as SIP-based and H.323 video telephony protocols using RTP/UDP/IP (Real-time Transport Protocol/User Datagram Protocol/Internet Protocol).

For MPEG-4 wireless transmissions using W-CDMA or CDMA2000, an RLC PDU or RLP PDU is the smallest unit that is subject to losses during transmission. For example, a W-CDMA RLC-PDU is 160-bytes long and is transmitted every 20 ms. In order to generate video slices that are roughly equal to the size of an LTU, the LTU size must be known. In some implementations, the LTU size may vary over time and requires that the underlying transport protocol/physical layer inform video encoder 20 of the LTU sizes. To that end, video-LTU size estimator 38 estimates the size of each video LTU and communicates this information to slice size determination module 28 in video encoder 20.

Video-LTU size estimator 38 may be implemented in a variety of ways. In some circuit-switched video applications over W-CDMA, the LTU size is constant and is always 160-bytes. As an example, if audio encoding operates at the rate of 12.2 Kbps, the number of bytes that can be used by video is 124 bytes. Hence, in this case, the video-LTU size is 124 bytes. If the audio encoding rate changes, the video-LTU size changes. In either case, video-LTU size estimator 38 passes this information up to video encoder 20 to perform the video slicing operation. For packet-switched networks, such as CDMA2000 1×, it may be necessary to determine video-LTU size dynamically for each RLP-PDU. Dynamic determination of video-LTU size may be facilitated if header overhead is removed, as is contemplated by 3GPP2 for video conferencing services.

As mentioned above, by passing LTU size information from the physical layer to MUX 18, and passing video-LTU size information from MUX 18 to video encoder 20, video encoder system 12 provides a unique transport-encoder cross-layer design that promotes efficient video slicing. According to this cross-layer design, transport layers pass additional information to video encoder 20 in order to efficiently place RMs that result in a close, but inexact, alignment between video slices and video-LTUs.

The techniques described herein may be implemented within a general purpose microprocessor, digital signal processor (DSP), application specific integrated circuit (ASIC), field programmable gate array (FPGA), or other equivalent logic devices. For example, video encoder system 12, and its components, may be implemented as parts of an encoding process, or coding/decoding (CODEC) process, running on a digital signal processor (DSP) or other processing device. Accordingly, components described as modules may form programmable features of such a process. Video encoder system 12 may have a dedicated memory for storing instructions and data, as well as dedicated hardware, software, firmware, or combinations thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

Figure 3:
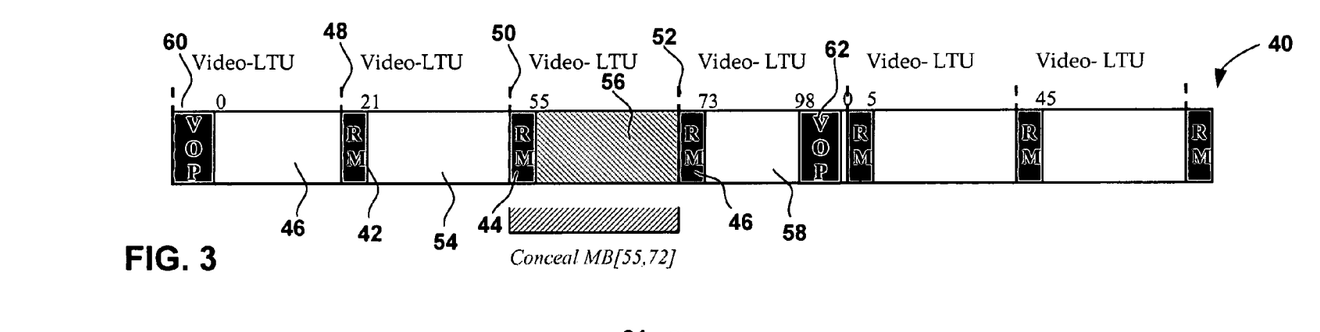
FIGS. 3, 4 and 5 are diagrams illustrating different video slicing techniques.
Figure 4:
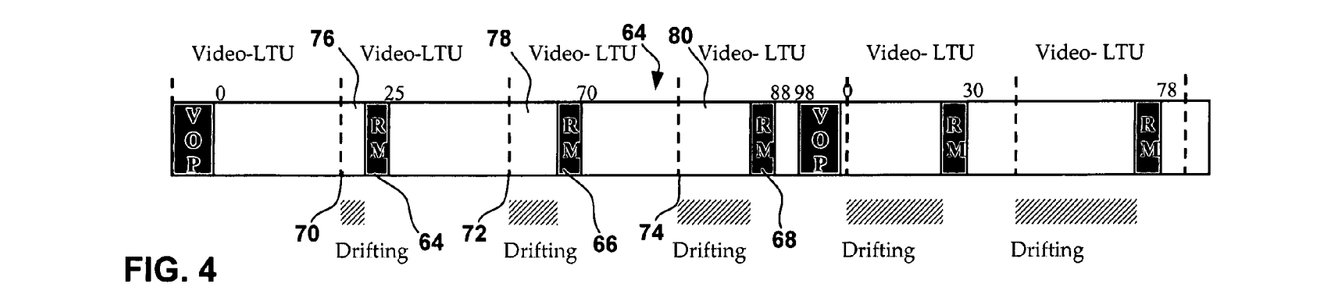
Figure 5:
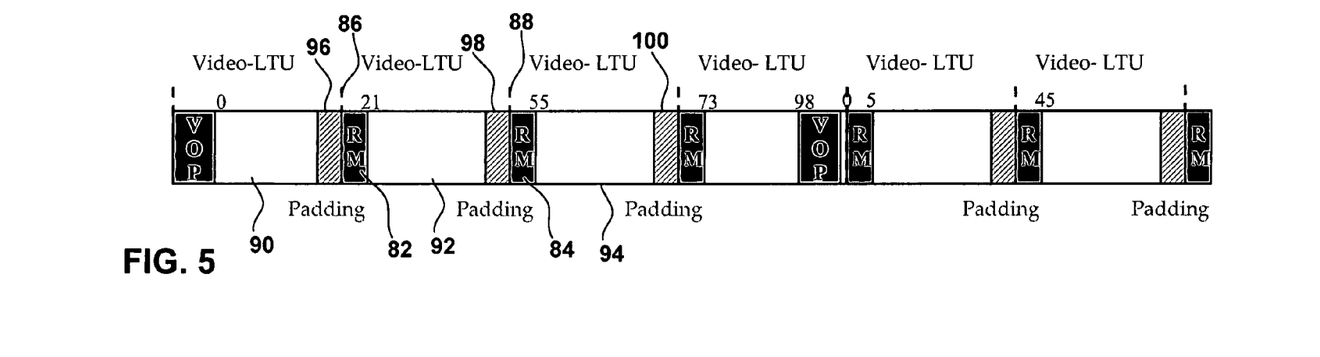

FIGS. 3, 4 and 5 are diagrams illustrating different video slicing techniques for purposes of comparison to the approximate alignment technique described herein. FIG. 3 illustrates a technique that requires exact alignment of RMs with video-LTU boundaries, and results in loss of only a single slice when a single video-LTU is lost. This approach suffers from high implementation complexity. FIG. 4 illustrates a technique in which no effort is made to align the RMs with video-LTU boundaries. Instead, RMs tend to drift into each video-LTU, resulting in loss of multiple slices when a single video-LTU is lost. FIG. 5 illustrates a slicing technique in which fixed slices are aligned with video-LTUs using padding bytes at the end of each slice. In this case, the padding bytes produce significant bandwidth inefficiencies.

In the example of FIG. 3, slices are aligned exactly with the smallest loss unit, i.e., the video-LTU. To implement the approach of FIG. 3, however, a video encoder must know and impose the LTU boundaries on the video bitstream, and then generate slices of the same size between two LTU boundaries. However, it is very difficult and costly to achieve such an implementation. In particular, RMs must be inserted at the MB boundaries, and cannot be placed at arbitrary byte-positions in the bitstream. With this constraint, it is difficult for the encoder to control the size of each slice. If the target size of a slice is K, the encoder usually cannot generate slices of exact size K due to the need to insert RMs at MB boundaries.

As shown in FIG. 3, for exact alignment, RMs 42, 44, 46 are placed exactly at the video-LTU boundaries 48, 50, 52 designating the start of Video-LTUs 54, 56, 58, respectively. Successive video data frames are bounded by video object plane (VOP) fields 60, 62 that signify the end of a preceding video data field. With exact alignment, loss of a single LTU results in the loss of a single video slice. In the example of FIG. 3, for example, loss of video-LTU 56 results in loss of a corresponding video slice containing MBs 55 through 72, i.e., MB [55, 72]. The slice aligned with preceding video-LTU 54 and the slice aligned with the succeeding video-LTU 58 remain intact and can be decoded, while MB [55, 72] for the slice aligned with the lost video-LTU 56 are concealed by the decoder.

In order to make implementations simpler, a video encoder may be configured to encode a slice at a target size of K, but permit the slice size to be larger than K. As shown in FIG. 4, such an implementation results in the placement of RMs 64, 66, 68 that tend to "drift" away from the video-RLC boundaries 70, 72, 74, respectively. This drift is represented by reference numerals 76, 78, 80. In the example of FIG. 4, when one video-LTU is lost, the data from two slices that fall across the boundaries of the lost video-LTU will be lost. Accordingly, the approach of FIG. 4 may result in significant performance degradation, particularly in error prone applications, such as wireless networking.

Some other implementations, as shown in FIG. 5, may generate video slices that are smaller than the video-LTU size K, and then add padding bytes to each slice so that the next RM can be placed exactly at the beginning of the next video-LTU. As shown in FIG. 5, RMs 82, 84 are placed exactly at the boundaries 86, 88, respectively, of successive video-LTUs 90, 92, 94. However, the size of each slice is selected to be less than the video-LTU size. Accordingly, each slice includes padding bytes 96, 98, 100 to fill the space between the end of the encoded video and the next video-LTU boundary. Naturally, this approach is inefficient in bandwidth due to the presence of padding bytes that are not utilized by the decoder. In addition, this approach tends to complicate encoder implementation. In particular, once the encoder determines that the current slice size exceeds the video-LTU size K, it is necessary to go back one MB, make a slice, start a new slice, and then re-encode the next MB.

An additional solution involves the use of rate control algorithms that accurately estimate the exact number of bits that will be spent on each MB for different quantization step-sizes, called quantization parameters (QPs). Slice-level rate control techniques attempt to determine best combinations of the number of MBs to be included into each slice and corresponding QPs for the MBs. Clearly, this approach is computationally expensive. Also, this approach is only capable of generating video slices that are close to video-LTU size K. In particular, even with variable sizes, MB boundaries will not always fall exactly on the video-LTU boundary. In this case, the use of padding bytes is still inevitable. Accordingly, rate control algorithms present both high implementation complexity and bandwidth inefficiency.

Figure 6:
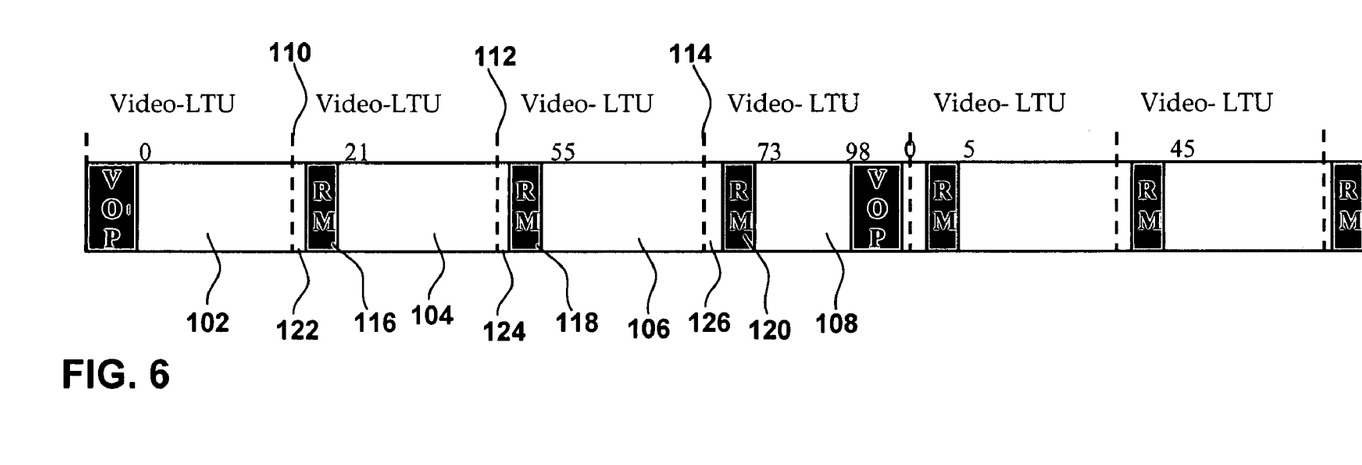
FIGS. 6 and 7 are diagrams illustrating a video slicing technique in accordance with this disclosure.
Figure 7:
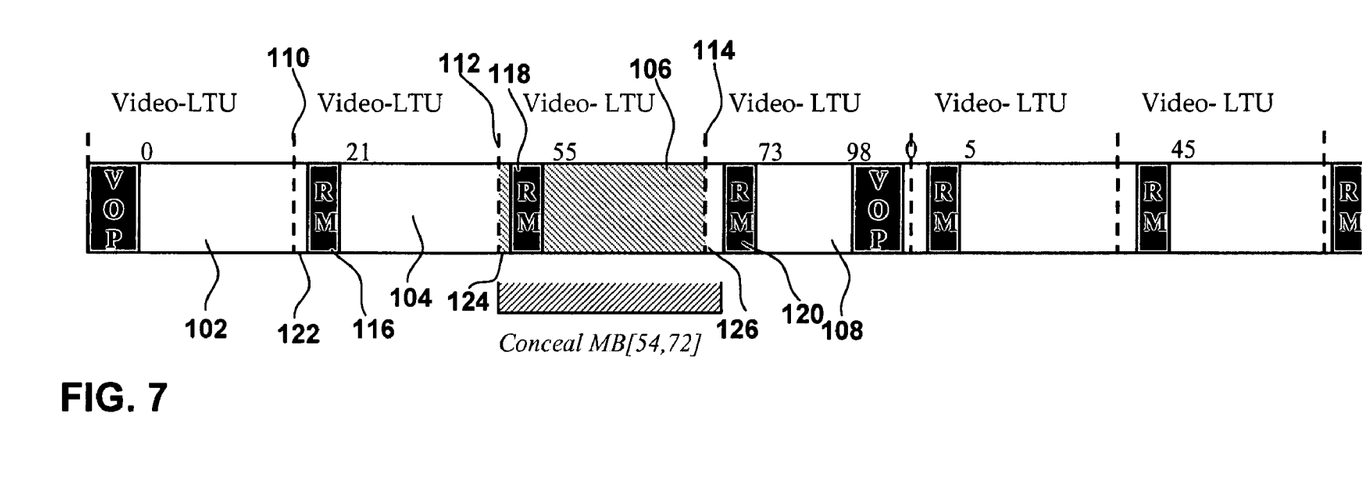

FIGS. 6 and 7 are diagrams illustrating a video slicing technique based on approximate alignment of slices and LTUs, in accordance with this disclosure. The video slicing technique shown in FIGS. 6 and 7 may be implemented within video encoder system 12 of FIG. 12. In general, the video slicing technique is capable of relatively low implementation complexity while achieving both error resiliency and bandwidth efficiency. As discussed above, the video slicing technique does not require exact alignment of RMs with video-LTU boundaries. Accordingly, a single slice need not fit exactly into a single video-LTU. Instead, each video slice is formulated so that an RM will be placed close to the beginning of each video-LTU. Hence, there is no need for exact alignment or tight rate control at the slice level, resulting in reduced encoder implementation complexity.

FIG. 6 depicts the video slicing technique in terms of the placement of RMs and slices relative to video-LTU boundaries. FIG. 6 shows video-LTUs 102, 104, 106, 108, video LTU boundaries 110, 112, 114, and RMs 116, 118, 120. Each slice extends from one RM to the next RM. As shown in FIG. 6, the beginning of each video-LTU contains a small end segment 122, 124, 126 of a previous slice. A major portion of the current slice then follows this small end segment 122, 124, 126 of the previous slice within the respective video-LTU 102, 104, 106. Like the previous slice, the current slice includes a small end segment that extends into the next video-LTU. Accordingly, each video-LTU contains a small amount of data from the previous slice and most of the data from the current slice.

When compared to the example of FIG. 3, where exact alignment between slices and LTUs is enforced, the video slicing approach of FIG. 6 can be seen as producing an approximate alignment between slices (RM to RM) and LTUs (LTU boundary to LTU boundary). For each slice, the target slice size is selected so that a small end segment of the slice will carry over into the next video-LTU. Then, the next RM can be readily inserted at the MB boundary defined by the end of that end segment. Thus, only a portion of a single MB will typically cross over into the next video-LTU.

FIG. 7 illustrates the performance of the approximate alignment technique of FIG. 6 in terms of the number of MBs that must be concealed when an LTU is lost. As shown in FIG. 7, the loss of one video-LTU 106 is roughly equivalent to losing a single slice. A very small end segment 126 of the slice is carried into the next LTU 108, which may be received correctly rather than lost. However, this small end segment 126 will not be used for decoding, because the decoder independently decodes slices. Therefore, in effect, the entire slice spanning video-LTU 106 is lost, along with the small end segment 126. In addition to losing one entire slice with the lost LTU 106, a very small end segment 124 from the preceding slice in LTU 104 will also be lost, because that end segment is carried into the present LTU 106. However, the remainder of the preceding slice is intact and can be decoded. In a typical implementation, the end segment of a slice that is carried into the next LTU will be only a portion of a single MB.

In comparison to the exact alignment approach of FIG. 3, the approximate alignment approach illustrated by FIGS. 6 and 7 provides reduced complexity with comparable bandwidth efficiency and error resiliency. In the example of FIG. 3, the exact alignment approach results in a loss of MBs from 55 to 72 (MB[54,72] when an LTU is lost. Notably, as shown in FIG. 7, the approximate alignment approach results in the loss of only one additional MB, i.e., MB 54 in MB[54,72]. The additional lost MB is the MB from the end segment of the preceding slice that carries into the current video-LTU 106. Therefore, the cost of using the approximate alignment approach described in this disclosure is the loss of just one additional MB. This cost, however, is balanced by a reduction in implementation complexity and bandwidth efficiency.

In operation, to ensure that all of the previous slice in the video-LTU 104 preceding a lost video-LTU 106 will not be dropped when an LTU error is detected, decoder system 14 should be configured to be aware of the approximate alignment approach applied by encoder system 12. In some embodiments, decoder system 14 may be specifically configured to handle slices generated according to the approximate alignment approach. In other embodiments, encoder system 12 and decoder system 14 may exchange control information to specify that the encoder system is using the approximate alignment approach and that the decoder system should configure itself accordingly. As further alternatives, some encoder systems 12 and decoder systems 14 may be configured to provide optional mode switching between approximate alignment, as described herein, exact alignment, padding, or slice-level rate control techniques.

Figure 8:
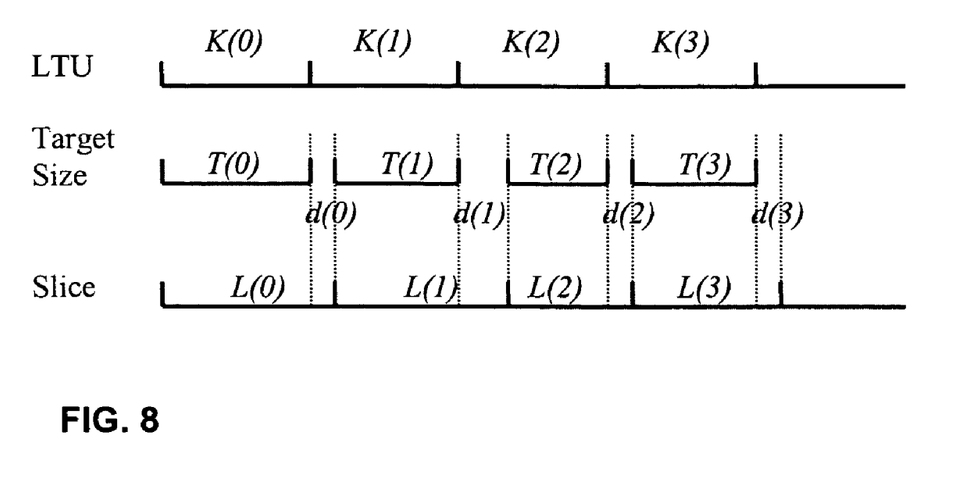
FIG. 8 is a diagram illustrating computation of video slice size in accordance with this disclosure.

FIG. 8 is a diagram illustrating computation of video slice size in accordance with this disclosure. As shown in FIG. 8, to implement the approximate alignment video slicing technique, encoder system 12 obtains the size of each LTU, which is represented by K(n), where n is the index indicating the position of each video-LTU in a series of LTUs to be transmitted over the air interface. Encoder system 12 encodes incoming bits in a video bitstream, and generates a video slice when the number of encoded bits exceeds a current target slice size T(n), where n is the index indicating the position of each slice within a series of slices.

According this technique, however, the target slice size of slice T(n) is not equal to K(n), which would require exact alignment. Again, due to the need to insert RMs at MB boundaries, exact alignment of slices and video-LTUs is difficult. Instead, the target slice size is adjusted each time a slice is made, in order to guarantee that the next RM will appear immediately after the next LTU boundary, e.g., within one MB of the video-LTU boundary. In other words, each RM need not be placed at the LTU boundary, but should be within one MB of the LTU boundary. This reduces complexity relative to techniques in which the RM must be placed at the LTU boundary, ensures that the RM is always sufficiently close to the boundary, and also avoids the need for padding bytes.

The adjustment of the target slice size T(n) is performed by calculating the difference between the actual encoded previous slice size L and the previous target slice size T(n), and then subtracting this difference from K(n). With reference to FIG. 8, adjustment of the target slice size T(n) is demonstrated by:

$T(n)=K(n)-d(n-1)$, where $d(n-1)=L(n-1)-T(n-1)$

In the above equations, T(n) is the current target slice size, K(n) is the current video-LTU size, and d(n-1) is the difference between the previous actual encoded slice size and the previous target slice size. The values are recalculated for each slice formulated by encoder system 12.

The slice size calculation described above with reference to FIG. 8 can be represented by the following pseudo code:

```
Given:
    The size of each LTU stored in an array K[n];
    Target slice size T;
    Initialize i = 0, T = K[0];
Start from encoding the first frame:
    While (more frames to encode)
    {
        While (more MBs to encode)
        {
            If (the current slice size >= T)
            {
                d = the current slice size − T;
                T = K[++i] − d;
                Reset the current slice size;
                Insert one RM and start a new slice;
                Update the current slice size;
            }
            Else
            {
                Encode this MB;
                Update the current slice size;
```
            }
        }
    }
```

Figure 9:
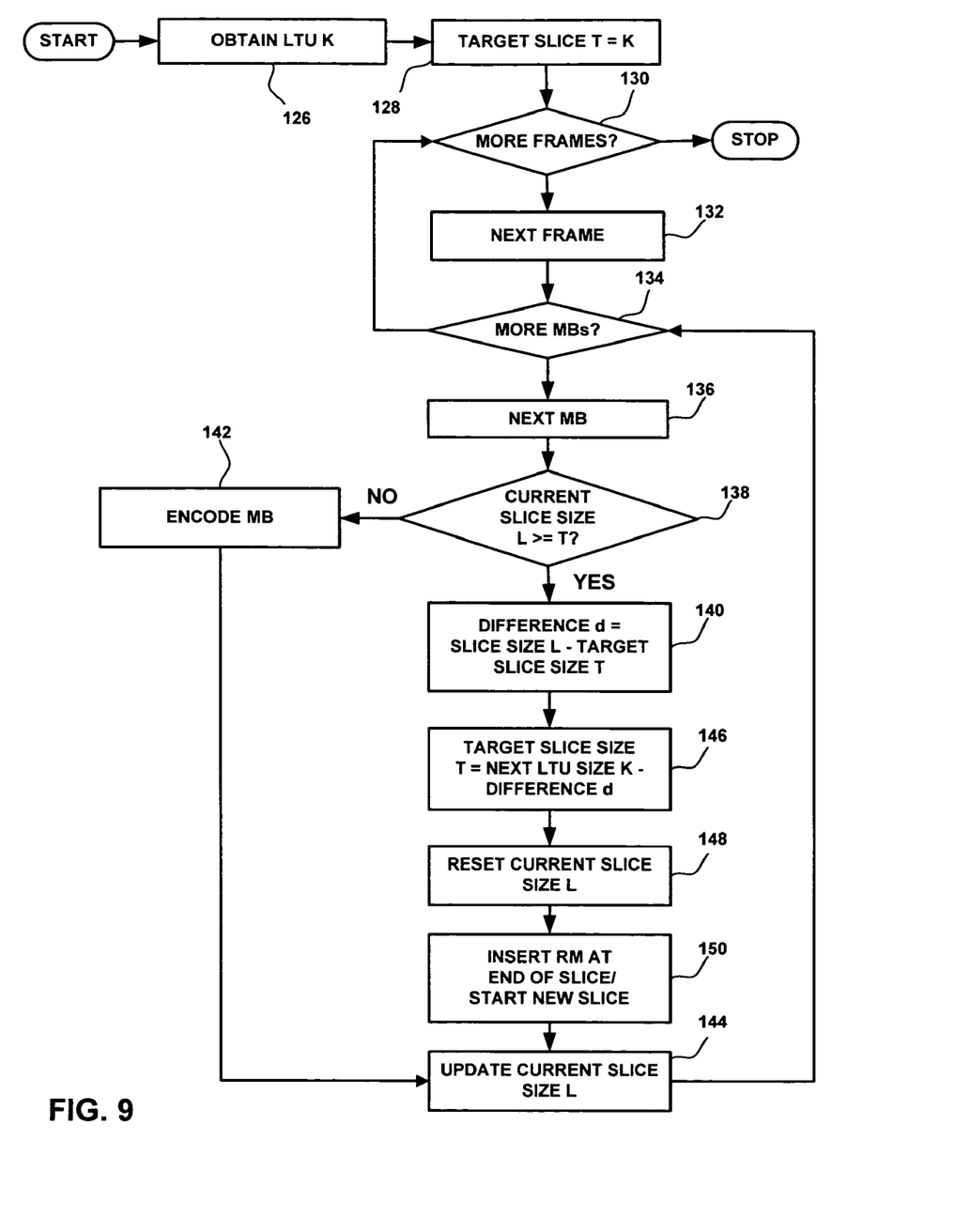
FIG. 9 is a flow diagram illustrating operation of a video slicing technique in accordance with this disclosure.

FIG. 9 is a flow diagram illustrating operation of a video slicing technique in accordance with this disclosure. The video slicing technique may be implemented using a variety of components, such as video slice generator 26, slice size determination module 28, and video-LTU size estimator 38 of FIG. 2. The flow diagram generally tracks the operations and results represented by the above pseudo code. As shown in FIG. 9, the technique involves obtaining the size K of a current video-LTU (126), and generating a target slice size T (128). Initially, for the first slice in a frame, the target slice size T is set to be equal to the LTU size K (128). The video-LTU size K may be obtained from video-LTU size estimator 38 (FIG. 2). The video slicing process iterates so long as video frames remain to be encoded (130). In particular, the process steps from frame to frame (132). Within a given frame, the process iterates so long as additional MBs remain to be encoded (134) within the applicable frame. Hence, the process steps from MB to MB within a frame (136).

For a given frame and MB, the video slicing technique determines whether the current slice size L is greater than or equal to the target slice size T (138). The current slice size L is determined by the number of MBs already encoded for the given slice. Hence, the actual slice size L will increase with each MB that is encoded. Initially, the target slice size T will be equal to the current LTU size K (128). When the current slice size L meets or exceeds the target slice size T (138), the process determines the difference d between the current slice size L and the target slice size T (140). If the current slice size L does not yet equal or exceed the target slice size T, the process continues to encode MBs (142), update the current slice size L (144) and return to process additional MBs (134).

The process next adjusts the target slice size T to be equal to the difference between the size K of the next video-LTU and the difference d (146). In this manner, the target slice size T is adjusted for the next pass through the loop. In particular, the next target slice size T will be less than the LTU size K by an amount equal to the size of the end segment of the preceding slice, i.e., the amount d. At this point, the process has reached the end of the current slice. The process therefore resets the current slice size L (148) for the next pass, inserts an RM at the end of the slice and starts a new slice (150). Upon updating the current slice size L (144), the process returns to process additional MBs in the applicable video frame, if available.

If the current slice size L does not meet or exceed the target slice size T, yet there are no more MBs to process within a given frame, the process has reached the end of the frame. In this case, for slices at the end of a frame only, the process may insert padding bytes to fill out the remainder of the applicable slice. However, this is in contrast to the placement of padding bytes within every video slice for slice-LTU alignment purposes. As an alternative to inserting padding bytes, data from the next frame may be inserted into the slice. This approach of inserting date from the next frame within a slice that contains data from the previous frame may result in a delay of one frame. However, this delay may be justified by a tradeoff for bandwidth efficiency.

In accordance with this disclosure, video encoder system 12 implements a cross-layer design between video encoder 20 and the lower layers, i.e., MUX 18 and modem 34. In this manner, video encoder 20 determines how the bitstream is segmented and multiplexed into LTUs in the transport layers. In particular, the size of each slice is provided from the lower layers. Slice size may vary, depending on how the video data is multiplexed with audio data. In addition, this technique assumes that video decoder 18 is aware of this particular encoding approach so that it will not discard useful data obtained before an LTU is lost.

Preliminary results through extensive experiments show that by using an approximate alignment technique for video slicing, the number of lost MBs can be reduced by 26% to 32%, compared to an existing technique that introduces drift between slices and LTU boundaries. According to the existing technique, the video encoder would set a fixed target slice size of 120 bytes and, when the size of current slice exceeds 120 bytes, the video would terminate the current slice and start a new slice. As discussed above, such an existing technique can result in significant drift. The improvement that can be obtained by an approximate alignment technique as described herein is significant, ranging from a 26% to 32% reduction in lost MBs, as described above.

Various embodiments have been described. These and other embodiments are within the scope of the following claims.

The invention claimed is:

1. A video encoding method comprising:
   determining, with a video encoder, a size of a video logical transmission unit (LTU);
   generating, with the video encoder, a target video slice size;
   encoding, with the video encoder, a first video slice until a size of the video slice is greater than the target video slice size;
   calculating, with the video encoder, a difference between the size of the first video slice and the target video slice size;
   inserting, with the video encoder, a resynchronization marker (RM) at an end of the first video slice;
   updating, with the video encoder, the target video slice size to equal the video LTU size minus the difference; and
   encoding, with the video encoder, a second video slice until a size of the second video slice is greater than the updated target video slice size.

2. The method of claim 1, wherein generating a target video slice size includes generating a target video slice size that is equivalent to the video LTU size.

3. The method of claim 1, further comprising repeating the calculating, inserting, updating and encoding operations for a plurality of video slices within a video frame.

4. The method of claim 1, wherein determining the video LTU size includes determining a size of a physical layer LTU including a video portion and an audio portion, determining a proportion of the video portion to the audio portion, and determining the video LTU size based on the physical layer LTU size and the proportion.

5. The method of claim 1, further comprising passing the physical layer LTU size to a multiplexing layer within a video communication device, and passing the video LTU size from the multiplexing layer to an encoding layer of the video communication device.

6. The method of claim 1, wherein inserting an RM includes inserting the RM at a macroblock (MB) boundary.

7. The method of claim 1, wherein the difference is less than one macroblock (MB) in size.

8. The method of claim 1, further comprising incorporating substantially no padding bytes in the first and second video slices.

9. The method of claim 1, wherein inserting the RM includes inserting the RM at or after a position corresponding to a boundary between successive video-LTUs.

10. The method of claim 1, further comprising multiplexing information contained in the video slices with audio information to form a plurality of multiplex protocol data units (MUX PDUs).

11. The method of claim 1, wherein a first portion of the first video slice resides within a first physical layer LTU and a second portion of the first video slice resides within a second physical layer LTU.

12. The method of claim 11, wherein the second portion of the first video slice is less than one macroblock (MB) in size.

13. A computer-readable medium comprising instructions to cause a processor to:
   determine a size of a video logical transmission unit (LTU);
   generate a target video slice size;
   encode a first video slice until a size of the video slice is greater than the target video slice size;
   calculate a difference between the size of the first video slice and the target video slice size;
   insert a resynchronization marker (RM) at an end of the first video slice;
   update the target video slice size to equal the video LTU size minus the difference; and
   encode a second video slice until a size of the second video slice is greater than the updated target video slice size.

14. The computer-readable medium of claim 13, wherein the generated target video slice size is equivalent to the video LTU size.

15. The computer-readable medium of claim 13, further comprising instructions to cause the processor to repeat the calculating, inserting, updating and encoding operations for a plurality of video slices within a video frame.

16. The computer-readable medium of claim 13, further comprising instructions to cause the processor to determine a size of a physical layer LTU including a video portion and an audio portion, determine a proportion of the video portion to the audio portion, and determine the video LTU size based on the physical layer LTU size and the proportion.

17. The computer-readable medium of claim 13, further comprising instructions to cause the processor to insert the RM at a macroblock (MB) boundary.

18. The computer-readable medium of claim 13, wherein the difference is less than one macroblock (MB) in size.

19. The computer-readable medium of claim 13, further comprising instructions to cause the processor to incorporate substantially no padding bytes in the first and second video slices.

20. The computer-readable medium of claim 13, further comprising instructions to cause the processor to insert the RM after a position corresponding to a boundary between successive video-LTUs.

21. The computer-readable medium of claim 13, further comprising instructions to cause the processor to insert the RM such that a first portion of the first video slice resides within a first physical layer LTU and a second portion of the first video slice resides within a second physical layer LTU.

22. The computer-readable medium of claim 21, wherein the second portion of the first video slice is less than one macroblock (MB) in size.

23. A video encoding system comprising:
   means for determining a size of a video logical transmission unit (LTU);
   means for generating a target video slice size;
   means for encoding a first video slice until a size of the video slice is greater than the target video slice size;

means for calculating a difference between the size of the first video slice and the target video slice size;

means for inserting a resynchronization marker (RM) at an end of the first video slice;

means for updating the target video slice size to equal the video LTU size minus the difference; and means for encoding a second video slice until a size of the second video slice is greater than the updated target video slice size.

24. A system for encoding video, the system comprising a memory configured to store video data; and a processor in communication with the memory and configured to:

determine a size of a video logical transmission unit (LTU);

generate a target video slice size;

encode a first video slice until a size of the video slice is greater than the target video slice size;

calculate a difference between the size of the first video slice and the target video slice size;

insert a resynchronization marker (RM) at an end of the first video slice;

update the target video slice size to equal the video LTU size minus the difference; and encode a second video slice until a size of the second video slice is greater than the updated target video slice size.

25. The system of claim 24, wherein the generated target video slice size is equivalent to the video LTU size.

26. The system of claim 24, wherein the processor is further configured to repeat the calculating, inserting, updating and encoding operations for a plurality of video slices within a video frame.

27. The system of claim 24, wherein the processor is further configured to determine a size of a physical layer LTU including a video portion and an audio portion, determine a proportion of the video portion to the audio portion, and determine the video LTU size based on the physical layer LTU size and the proportion.

28. The system of claim 24, wherein the processor is further configured to insert the RM at a macroblock (MB) boundary.

29. The system of claim 24, wherein the difference is less than one macroblock (MB) in size.

30. The system of claim 24, wherein the processor is further configured to incorporate substantially no padding bytes in the first and second video slices.

31. The system of claim 24, wherein the processor is further configured to insert the RM after a position corresponding to a boundary between successive video-LTUs.

32. The system of claim 24, wherein the processor is further configured to insert the RM such that a first portion of the first video slice resides within a first physical layer LTU and a second portion of the first video slice resides within a second physical layer LTU.

33. The system of claim 32, wherein the second portion of the first video slice is less than one macroblock (MB) in size.

* * * * *